United States Patent Office 3,243,402
Patented Mar. 29, 1966

3,243,402
HIGHLY STABLE HALOGENATED POLYVINYL PLASTISOLS
Calogero Corso, Milan, Italy, assignor to Montecatini Società Generale per l'Industria Mineraria e Chimica, Milan, Italy
No Drawing. Filed Dec. 5, 1960, Ser. No. 73,525
Claims priority, application Italy, Dec. 12, 1959, 20,891/59
3 Claims. (Cl. 260—31.8)

This invention relates to halogenated polyvinyl plastisols generally employed for preparing vinyl forms and other uses. For all such uses the plastisols should be of permanently constant viscosity to make their use possible even a certain period after preparation thereof. If they lack such stability, they necessarily require to be used within the shortest possible delay.

Plastisols known to date are not sufficiently stable with time, wherefore the main object of this invention is to eliminate this drawback by providing compositions (plastisol) chiefly comprising a halogenated vinylpolymer or copolymer and a plasticizer of high stability and low viscosity.

It has been astonishingly found that this requirement can easily be met by adding to plastisols of the above referred type a condensate of ethylene oxide with an aliphatic acid having 8 to 14 carbon atoms, such as lauric acid. The condensate should be a liquid of a high boiling point, capable of inhibiting flocculation of the plastisol by lowering the interface tension of the polymer and plasticizer. The preferred and most advantageous condensates are such containing 2 to 10 molecules ethylene oxide to each molecule of aliphatic acid. As will be better understood hereafter, best results are obtained by selecting proportions of the condensate ranging between 0.1 and 6% by weight to the weight of the plastisol (polymer plus plasticizer); quantities below 0.1% are insufficient, while quantities exceeding 6% are no longer useful and are even objectionable in some respects, such as wandering of the condensate in the manufactured articles, lengthening of the gelling period.

The chlorinated vinyl polymer with which this invention is more particularly concerned is polyvinyl chloride; however, the invention may be successfully employed also in connection with copolymers of vinyl chloride, such as vinyl acetate, vinyl stearate, methylacrylates, ethyl and hexyl, vinylidene chloride, acrylonitrile, ethylene, propylene, butadiene, styrol, α-methylstyrol, maleates, fumarates and the like, provided the quantity of co-monomer does not exceed 5% of the vinyl chloride.

All plasticizers for polyvinyl chloride are useful as plasticizers for the purposes of this invention, such as di-2-ethyl-hexyl-phthalate and dialkyl esters of phthalic acid generally, as well as dialkyl esters of adipic, sebacic, phosphoric acids and further dialkyl esters known in this field.

The vinyl polymer or copolymer is obtained by emulsion polymerizing. The ethylene oxide condensate is added to the latex on completion of polymerization, to the dried polymer or during the plastisol preparing step. In the first mentioned case addition is effected while stirring, the resulting mixture being dried in a spray dryer such as of the type known as "Nubilosa." Admixture to the dried polymer in powder form merely requires a thorough mixing, such as in a device of the Werner type or the like. The same applies to admixture during preparation of plastisol. The mixtures are generally prepared at ordinary temperature; alternatively, operation can be carried out at higher temperatures, as required, provided the softening temperature of the halogenated vinyl polymer is not exceeded.

EXAMPLE I 58 parts by weight of the polymer of vinyl chloride, of a Fikentscher's K value of 75.7 prepared by emulsion polymerizing are admixed in powder form with 2 parts by weight of a condensate of 5 mols ethylene oxide with 2 mols lauric acid. Mixture is effected at ordinary temperature in a device of the Werner type. The polyvinyl chloride/condensate composition is then admixed with 40 parts by weight of di-2-ethyl-hexyl-phthalate.

Viscosimetric measurements were effected on the composition by means of a rotational viscosimeter (I.R.V.), at 25° C., and fall time measurements were effected between two limits spaced 10 cm. with a metal ball weighing 2 grs. through a plastisol in a test tube of 20 mm. diameter.

The condensate containing plastisol gave the following results:

|  | After 1 day | After 15 days | After 30 days |
|---|---|---|---|
| Viscosity at 10 revolutions (centipoise) | 4,400 | 4,800 | 4,800 |
| Yield point or gelling point | 0 | 0 | 0 |
| Fall time | ¹ 15 | ¹ 24 | ¹ 29 |

¹ Sec.

A similar composition comprising polyvinyl chloride/di-2-ethyl-hexyl-phthalate in a 60/40 ratio gave the following results:

|  | After 1 day | After 15 days | After 30 days |
|---|---|---|---|
| Viscosity at 10 revolutions (centipoise) | 6,000 |  | Plastisol does not flow. |
| Yield point or gelling point | 300 |  |  |
| Fall time | 0 |  |  |

EXAMPLE II

A composition of the plastisol type is prepared by mixing 39 parts by weight of di-2-ethyl-hexyl-phthalate, 60 parts polyvinyl chloride ($K=77$) and one part condensate of 5 mols ethylene oxide and 1 mol lauric acid.

The mixture was stirred during 30 minutes and yielded a plastisol of the following rheological characteristics:

|  | After 1 day | After 15 days | After 30 days |
|---|---|---|---|
| Viscosity at 10 revolutions (centipoise) | 3,600 | 4,400 | 4,400 |
| Yield point or gelling point | 0 | 0 | 0 |
| Fall time | ¹ 12 | ¹ 24 | ¹ 26 |

¹ Sec.

EXAMPLE III

A composition of the plastisol type is prepared by spraying a polyvinyl chloride latex ($K=72$) and a condensate from 2 mols ethylene oxide and 1 mol lauric acid in a drier of the Nubilosa type; the resulting mixture contained 57 parts by weight of polyvinyl chloride and 3 parts by weight of condensate, and was admixed with 40 parts by weight of di-2-ethyl-hexyl-phthalate.

The resulting plastisol was of the following characteristics:

|  | After 1 day | After 7 days | After 15 days |
|---|---|---|---|
| Viscosity at 10 revolutions (centipoise) | 2,800 | 3,500 | 4,200 |
| Yield point or gelling point | 0 | 0 | 0 |
| Fall time | [1] 10 | [1] 24 | [1] 31 |

[1] Sec.

EXAMPLE IV

The latex of a polyvinyl chloride ($K=74$) is admixed with a condensate of 10 mols ethylene oxide and 1 mol lauric acid while stirring and is thereupon sprayed in a drier. The resulting mixture contained 64 parts polyvinyl chloride and 1 part condensate. The polymer obtained by mixing with 35 parts di-2-ethyl-hexyl-phthalate to obtain a 65/35 plastisol was of the following rheological characteristics:

|  | After 1 day | After 15 days | After 30 days |
|---|---|---|---|
| Viscosity | 4,800 | 6,300 | 7,000 |
| Yield point | 0 | 0 | 0 |
| Fall time | [1] 20 | [1] 73 | [1] 1.41 |

[1] Sec.

When latex is sprayed without a tensioactive agent a polymer is obtained which when admixed in a 65/35 ratio with di-2-ethyl-hexyl-phthalate yields the following rheological data:

|  | After 1 day | After 15 days | After 30 days |
|---|---|---|---|
| Viscosity | 9,100 | The paste does not flow. | |
| Yield point | 0 | | |
| Fall time | 5 min. | | |

The following table shows the variation in viscosity of plastisol depending upon the percentage of condensate added in accordance with Example II:

|  | 0% | 0.1% | 1% | 2% | 5% |
|---|---|---|---|---|---|
| Viscosity: | | | | | |
| After 1 day | 6,000 | 4,500 | 3,600 | 3,000 | 2,000 |
| After 15 days | ([1]) | 7,000 | 4,400 | 3,100 | 2,000 |
| After 30 days | | 9,500 | 4,400 | 3,100 | 2,000 |

[1] The plastisol does not flow.

The values given in the above table should of course not be indiscriminately applied to all plastisols obtainable in accordance with this invention, for it will be obvious and even intuitive that such values mainly depend upon the specific condensate added, quality and content of any copolymer present, etc. However, it was found that the above values are a fairly faithful representation of the average results heretofore obtained.

It will be understood that this invention is not limited to the above specific examples, for numerous modifications and adaptations can be carried out by experts on the ground of the teaching in this specification without departing from the scope of the appended claims.

What I claim is:

1. A colloidal dispersion of a copolymer of vinyl chloride with not more than 5% by weight based on said vinyl chloride of a member selected from the group consisting of vinyl acetate, vinyl stearate, methyl-, ethyl- and hexyl-acrylates, vinylidene chloride, acrylonitrile, ethylene, propylene, butadiene, styrene, alpha-methyl styrene, maleates and fumarates, in an organic liquid plasticizer for the copolymer, including a stabilizing agent consisting of the condensation product of ethylene oxide with lauric acid, said condensation product having 2 to 10 mols of ethylene oxide to each mol of lauric acid, said condensation product being present in the amount between about 0.1% and about 6% of the combined weight of the copolymer plus the plasticizer.

2. A colloidal dispersion of polyvinyl chloride in an organic liquid plasticizer for the polymer, including a viscosity-stabilizing agent consisting of the condensation product of ethylene oxide with lauric acid, said condensation product containing 2 to 10 mols of ethylene oxide to each mol of lauric acid, said condensation product being present in an amount between about 0.1% and about 6% of the combined weight of polyvinyl chloride plus the plasticizer.

3. A colloidal dispersion of polyvinyl chloride in di-2-ethyl-hexyl-phthalate, including 0.1% to 6% by weight of a stabilizing agent consisting of a condensation product of ethylene oxide with lauric acid, said condensation product containing 2 to 10 mols of ethylene oxide to each mol of lauric acid, said weight of the stabilizing agent based on the combined weight of polyvinyl chloride and di-2-ethyl-hexyl-phthalate and said colloidal dispersion having an I.R.V. viscosity value at 25° C. below 9,500.

References Cited by the Examiner

UNITED STATES PATENTS

| 1,970,578 | 8/1934 | Schoeller et al. | 260—458 |
| 2,664,410 | 12/1953 | Darby et al. | 260—31.4 |
| 2,666,752 | 1/1954 | Grummitt et al. | 260—45.85 |
| 2,852,482 | 9/1958 | Graham | 260—45.85 |

OTHER REFERENCES

Partridge et al.: Rubber Age, vol. 67, No. 5, August 1950, pp. 553–560.

Sisley et al.: Encyclopedia of Surface-Active Agents, Chemical Publishing Co., Inc., New York, 1952, p. 120.

MORRIS LIEBMAN, *Primary Examiner.*

DANIEL ARNOLD, *Examiner.*

R. C. STEWART, K. B. CLARKE, L. T. JACOBS,
*Assistant Examiners.*